US 6,695,981 B2

(12) United States Patent
Igarashi et al.

(10) Patent No.: US 6,695,981 B2
(45) Date of Patent: Feb. 24, 2004

(54) METHOD FOR MANUFACTURING LUMINESCENT MATERIAL, LUMINESCENT MATERIAL MANUFACTURED BY THE SAME MANUFACTURING METHOD, AND DISPLAY SUBSTRATE AND DISPLAY APPARATUS HAVING THE SAME LUMINESCENT MATERIAL

(75) Inventors: Takahiro Igarashi, Kanagawa (JP); Tsuneo Kusunoki, Kanagawa (JP); Katsutoshi Ohno, Tokyo (JP); Yasushi Ito, Kanagawa (JP)

(73) Assignee: Sony Corporation (JP)

( * ) Notice: Subject to any disclaimer, the term of this patent is extended or adjusted under 35 U.S.C. 154(b) by 19 days.

(21) Appl. No.: 09/927,536

(22) Filed: Aug. 13, 2001

(65) Prior Publication Data

US 2002/0074536 A1 Jun. 20, 2002

(30) Foreign Application Priority Data

Aug. 15, 2000 (JP) ..................... P2000-246213

(51) Int. Cl.$^7$ ............................................. C09K 11/02
(52) U.S. Cl. .......................... 252/301.4 S; 252/301.4 R; 252/301.4 F; 252/301.6 R; 252/301.6 S; 428/690; 428/403; 428/404; 427/212; 427/215
(58) Field of Search ................................. 427/212, 215; 428/403, 404, 690; 252/301.4 R, 301.4 S, 301.6 S, 301.6 R

(56) References Cited

U.S. PATENT DOCUMENTS

| | | | | |
|---|---|---|---|---|
| 2,817,599 A | * | 12/1957 | Edwards et al. | ............ 428/328 |
| 5,185,207 A | * | 2/1993 | Furuoka et al. | ............. 428/404 |
| 6,420,026 B1 | * | 7/2002 | Okamoto et al. | ........... 428/370 |
| 6,423,408 B2 | * | 7/2002 | Okamoto et al. | ........... 428/370 |
| 6,465,144 B1 | * | 10/2002 | Hashimoto et al. | ...... 430/106.1 |

FOREIGN PATENT DOCUMENTS

| | | | |
|---|---|---|---|
| JP | 48-73385 | * | 10/1973 |
| JP | 49-183 | * | 1/1974 |
| JP | 7-188652 | * | 7/1995 |

OTHER PUBLICATIONS

"Hawley's Condensied Chemical Dictionary", 12$^{th}$ ed., p. 1224, 1993.*
"Grant & Hackh's Chemical Dictionary", 5$^{th}$ ed., p. 626–627, 1987..*
Encylopeadia Britannica Online, "water glass", 2003.*
Translation of JP 07–312287.*

* cited by examiner

Primary Examiner—Melissa Koslow
(74) Attorney, Agent, or Firm—Rader, Fishman & Grauer PLLC; Ronald P. Kananen

(57) ABSTRACT

The present invention provides a method for manufacturing a luminescent material whereby the surfaces of phosphor particles are uniformly coated with glass, and a luminescent material made up of such particles is easily obtainable, a luminescent material manufactured by the manufacturing method, and a display substrate and a display apparatus having the luminescent material. The luminescent material is manufactured through the steps of adding a phosphor in the form of a solid solution comprising a sulfide or an oxysulfide, and a luminescent center substance incorporated in the sulfide or the oxysulfide in an aqueous solution containing water glass with stirring; adding the resulting aqueous solution to an aqueous solution of a metallic salt with stirring; forcedly extracting particles of the phosphor from the resulting aqueous solution; and drying the particles of the phosphor extracted. The display substrate and the display apparatus are obtained by applying the luminescent material onto a glass plate or the like.

28 Claims, 3 Drawing Sheets

METHOD FOR MANUFACTURING LUMINESCENT MATERIAL, LUMINESCENT MATERIAL MANUFACTURED BY THE SAME MANUFACTURING METHOD, AND DISPLAY SUBSTRATE AND DISPLAY APPARATUS HAVING THE SAME LUMINESCENT MATERIAL

BACKGROUND OF THE INVENTION

1. Field of the Invention

The present invention relates to a method for manufacturing a luminescent material, a luminescent material manufactured by the manufacturing method, and a display substrate and a display apparatus having the luminescent material. More particularly, it relates to a method for manufacturing a luminescent material in which the surfaces of phosphor particles are coated with glass, a luminescent material manufactured by the manufacturing method, and a display substrate and a display apparatus having the luminescent material.

2. Description of the Related Art

In recent years, a field-emission display (hereinafter, referred to as a FED) has received attention as a display which has achieved a low profile. In a conventional TV cathode-ray tube display, an electron beam can sufficiently penetrate into a luminescent material particle because its high acceleration voltage (from 30 Kv), resulting in a wide-range excitation. Namely, the luminescent material can receive the excitation energy (energy of the electron beam) over the wide-range area thereof, resulting in less burden on the luminescent material. However, in the FED, since the luminescent material is excited at a low acceleration voltage (from 10 Kv), the penetration distance of an electron beam is shortened. Accordingly, the luminescent material must receive the excitation energy within the narrow-range area thereof, resulting in more burden on the luminescent material.

FIG. 1 is a view for schematically illustrating the penetration behavior of an electron beam into a luminescent material, i.e., a phosphor. The electron beam (thermoelectrons) emitted into the phosphor consecutively undergoes collision and scattering in the phosphor to lengthen the mean free path into the deep recesses of the phosphor because of its high energy when emitted at a high acceleration voltage (A of FIG. 1). Accordingly, the area of the phosphor to be excited is expanded, resulting in an increase in emission luminance. In contrast, when emitted at a low acceleration voltage (B of FIG. 1), the scattering area of the thermoelectrons in the phosphor cannot be expanded. Accordingly, the area of the phosphor to be excited is narrowed, resulting in a reduction in emission luminance.

In the FED, since the acceleration voltage is low, a large amount of current must be passed therethrough in order to obtain sufficient luminance. However, most luminescent materials have low electric conductivity. Therefore, passage of a large amount of current therethrough promotes electrification on the surfaces of the luminescent material particles. This electrification then causes an increase in temperature to accelerate the degradation of the luminescent material. Thus, the conditions of low acceleration voltage and high current under which the luminescent material in the FED is excited act as adverse conditions accelerating the degradation of the luminescent material. For the FED, the overcoming of the degradation is an important problem.

Further, in the FED, the luminescent surface is formed by a method in which a luminescent material is applied onto a glass substrate, or the like. For this reason, the luminescent material is required to be efficiently obtainable in keeping with a trend toward a larger-size a screen. Therefore, such efficient acquisition of the luminescent material becomes another important problem.

Incidentally, the luminescent materials to be used for a display include an oxide-based luminescent material and a sulfide-based luminescent material. Both have their respective advantages and disadvantages. For the oxide-based luminescent material, the life characteristics are superior, but the luminous efficiency and the emitted color are inferior. Whereas, for the sulfide-based luminescent material, the life characteristics are inferior, but the luminous efficiency and the emitted color are superior.

If the oxide-based luminescent material is used in the FED which regards the overcoming of the degradation of the luminescent material as a critical problem as described above, no problem occurs with respect to the degradation. But, on the other hand, there occur problems in that the power consumption is increased because of the low luminous efficiency when the luminescent material is used as a display, and in that the emitted color is inferior, and the color reproducibility is not excellent.

In contrast, the sulfide-based luminescent material is an attractive material as a luminescent material for the FED because of its excellent luminous efficiency and emitted color. Therefore, if the life characteristics of the sulfide-based luminescent material can be improved, it is possible to improve the performance thereof as a display for the FED correlatively with its luminous efficiency and emitted color. Thus, in the FED, improvement of the life of the luminescent material, or the efficient acquisition of the luminescent material having an improved life has been long awaited for the sulfide-based luminescent material.

The deterioration of the luminescent material by an electron beam can be inhibited by the following methods:

i) A method in which a mixed type luminescent material including a conductive substance mixed therein, or a deterioration-resistant luminescent material mixed therein is used; and ii) A method in which the luminescent material particles are surface-coated with a chemically stable substance (typical examples of such a substance may include glass).

As for the method (ii), the following methods have been adopted: a method in which water glass is diluted with an aqueous alkaline solution for coating when the luminescent material of an alkaline-earth metallic sulfide having a hydrolytic property such as calcium sulfide (CaS) is surface-coated with water glass (see Japanese Laid-Open Patent Publication No.Sho 58-80375, below, referred to as a first method); a method in which in coating the phosphor surface with water glass, an aqueous mixed solution of water glass, aluminium sulfate, and sodium hydroxide is used for coating (see Japanese Laid-Open Patent Publication No.Hei 7-312287, blow, referred to as a second method); and further, a method in which a suspension obtained by adding a luminescent material and water glass in an aqueous barium acetate solution is supplied into an inverted cathode-ray tube (CRT) from the neck portion to deposit the luminescent material on the faceplate (below, referred to as a third method).

However, with the method (i), there have occurred the following problems: it is difficult to uniformly disperse the mixed substance in a slurry or a paste according to a difference in specific gravity, particle size, and particle shape in forming a fluorescent surface by a slurry method or a printing method; all the luminescent material particles are not in contact with the mixed substance, so that sufficient mixing effects cannot be exerted; and the like.

Further, out of the methods (ii), with the first method, i.e., the method in which water glass is diluted with an aqueous alkaline solution for coating, there have occurred the following problems: when this method is applied to a luminescent material containing zinc sulfide as a matrix, a glass film is formed in an islands structure, or the film thickness distribution is not uniform, thereby to cause the chemical reaction with a residual gas on the luminescent material surface, and particularly the oxidation of the surface and the separation of sulfur for the sulfide-based luminescent material, resulting in accelerated degradation, and no luminance degradation inhibiting effect; and the like. With the second method, i.e., the method in which an aqueous mixed solution of water glass, aluminium sulfate, and sodium hydroxide is used for coating, there have occurred the following problems: the aluminium included in the glass tends to form a solid solution with the zinc sulfide, so that a change in emitted color and a reduction in luminous efficiency may be caused; and the like.

Still further, with the third method, i.e., the method in which a luminescent material is deposited on the CRT faceplate from a suspension obtained by adding a luminescent material and water glass in an aqueous barium acetate solution, there has occurred the following problem: although a glass film can be uniformly formed on each luminescent material particle, much time is taken for the deposition and the treatment of an undesired solution, so that the luminescent material cannot be obtained efficiently.

SUMMARY OF THE INVENTION

The present invention has been completed in view of such circumstances. It is therefore an object of the present invention is to provide a manufacturing method whereby when the surfaces of phosphor particles are coated with a chemically stable substance (glass), it becomes possible to uniformly coat the surface of every phosphor particle with the substance (glass), and it is possible to efficiently obtain a luminescent material made up of such particles. In addition, it is further objects to obtain a luminescent material by such a manufacturing method, and to provide a display substrate and a display apparatus having the same.

Specifically, in accordance with a first aspect of the present invention, there is provided a method for manufacturing a luminescent material which comprises, the steps of: adding a phosphor in the form of a solid solution comprising a sulfide or an oxysulfide, and a luminescent center substance incorporated in the sulfide or the oxysulfide in an aqueous solution containing water glass with stirring; adding the resulting aqueous solution to an aqueous solution of a metallic salt with stirring; forcedly extracting particles of the phosphor from the resulting aqueous solution; and drying the particles of the phosphor extracted.

In accordance with further aspects of the present invention, there is provided a manufacturing method of each of a luminescent material according to the first aspect of the present invention, wherein the sulfide is zinc sulfide, and the luminescent center substances are silver and chlorine; a luminescent material according to the first aspect of the present invention, wherein the sulfide is zinc sulfide, and the luminescent center substances are silver and aluminium; a luminescent material according to the first aspect of the present invention, wherein the sulfide is zinc sulfide, and the luminescent center substances are silver, aluminium, and copper; a luminescent material according to the first aspect of the present invention, wherein the sulfide is zinc sulfide, and the luminescent center substances are copper and aluminium; a luminescent material according to the first aspect of the present invention, wherein the sulfide is zinc sulfide, and the luminescent center substances are copper, gold, and aluminium; and a luminescent material according to the first aspect of the present invention, wherein the oxysulfide is yttrium oxysulfide, and the luminescent center substance is europium.

In accordance with still further aspects of the present invention, there are provided a luminescent material manufactured by the same method, and a display substrate using the luminescent material, and a display apparatus using the same.

In accordance with the present invention, a luminescent material is manufactured through the steps of adding a phosphor in the form of a solid solution comprising a sulfide or an oxysulfide, and a luminescent center substance incorporated in the sulfide or the oxysulfide in an aqueous solution containing water glass with stirring; adding the resulting aqueous solution to an aqueous solution of a metallic salt with stirring; forcedly extracting particles of the phosphor from the resulting aqueous solution; and drying the particles of the phosphor extracted. Therefore, glass is uniformly coated around every phosphor particle. In addition, it is possible to efficiently manufacture a luminescent material made up of such particles.

Further, in the luminescent material manufactured through such manufacturing steps, the glass coated around the phosphor particles is uniform. Accordingly, the chemical reaction with a residual gas on the surface of the luminescent material, particularly for a sulfide-based luminescent material, oxidation of the surface and separation of sulfur will not occur, resulting a longer life as the luminescent material.

Still further, in the display substrate having the luminescent material manufactured through the manufacturing steps of the present invention, the luminescent surface can be formed in a short time. Therefore, by using such a substrate, it is possible to improve the productivity of the display apparatus.

Furthermore, the display apparatus having the luminescent material manufactured through the manufacturing steps of the present invention is usable for a long period as a display apparatus because of the long life of the luminescent material.

DETAILED DESCRIPTION OF THE PREFERRED EMBODIMENTS

First, a manufacturing method of a luminescent material in accordance with the present invention will be described.

Figure 1:
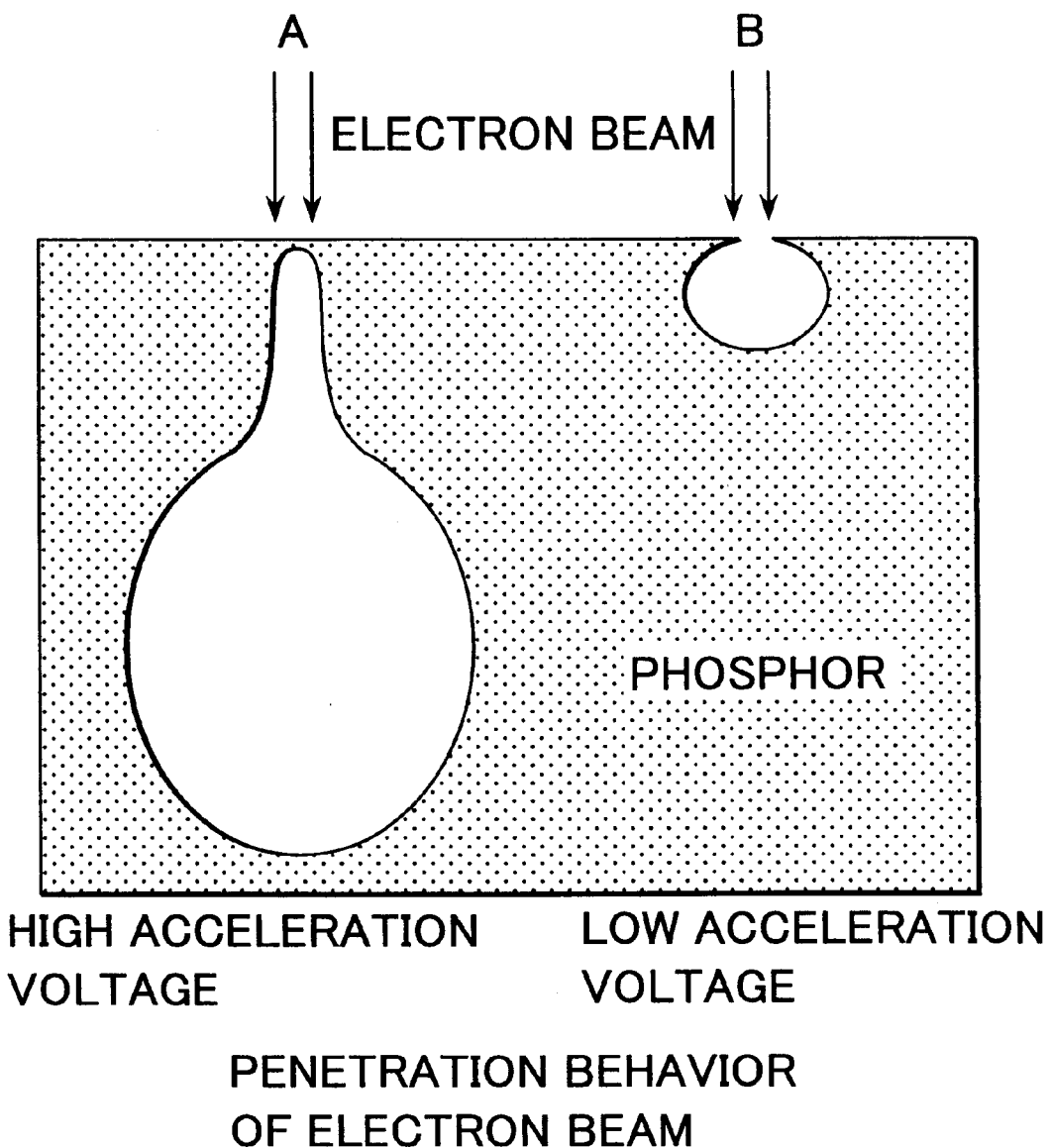
FIG. 1 is a view for illustrating the penetration behavior of an electron beam into a luminescent material.
Figure 2:
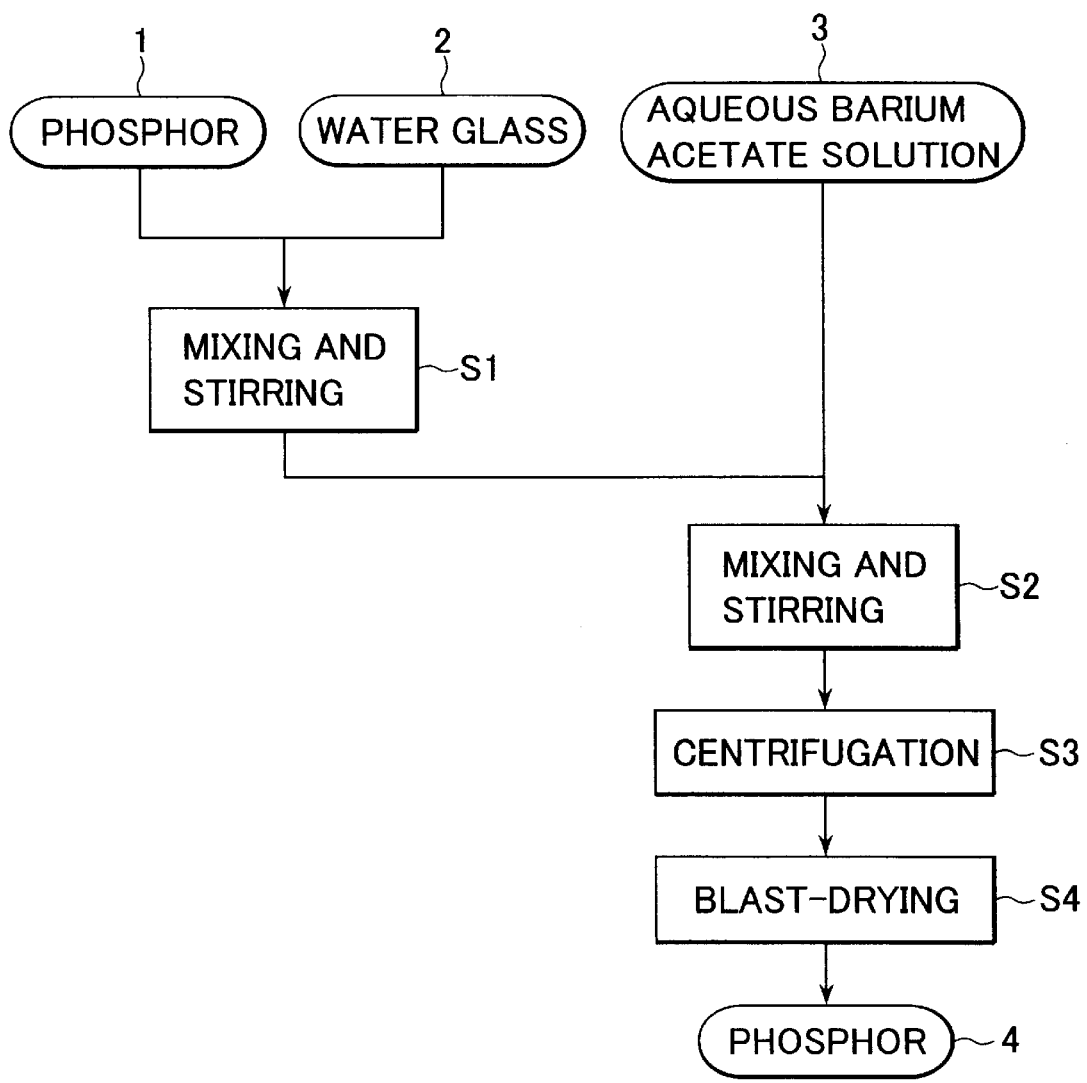
FIG. 2 is a flowchart for showing the process of manufacturing a luminescent material in accordance with the present invention.

FIG. 2 is a flowchart for showing the flow of steps for manufacturing the luminescent material in accordance with the present invention. In the figure, a reference character "S" denotes the manufacturing step. The luminescent material in accordance with the present invention is manufactured by the steps in the following order:

(a) A phosphor 1 in the form of a solid solution including a luminescent matrix, and a luminescent center substance incorporated in the luminescent matrix is added to an aqueous solution 2 containing water glass ($K_2 \cdot SiO_2$) with stirring to form a suspension (S1);

(b) The suspension is added to an aqueous solution of barium acetate ($Ba(CH_3OO)_2$) 3 with stirring (S2);

(c) Particles of the phosphor are extracted from the aqueous solution by a compulsory separating means such as a centrifugal separator (S3); and (d) The phosphor particles thus extracted are blast dried by warm air (S4).

In this process, water glass and barium acetate react with each other in the following manner:

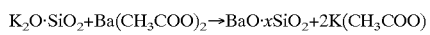

where x is a given number,

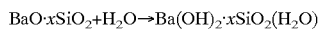

Accordingly, a glass gel comprising $Ba(OH)_2 \cdot xSiO_2$ is formed, and the resulting glass gel coats the phosphor particle surfaces. A luminescent material 4 thus coated with glass through the four steps S1 to S4 is synthesized.

According to the foregoing method, the glass gel comprising $Ba(OH)_2 \cdot xSiO_2$ is uniformly coated on the surface of every phosphor particle in the stirring step (S2). As a result, the chemical reaction on the resulting luminescent material surface is inhibited, so that the degradation of the luminescent material can be largely reduced. Among the phosphor particles, only the particles uniformly surface-coated with glass are forcedly separated from other particles in the compulsory separating step by means of a centrifugal separator (S3). In addition, the particles thus separated are dried in the blast drying step (S4). Consequently, it is possible to efficiently obtain a desired luminescent material 4.

Then, the examples of the present invention will be described.

First, for the sulfide-based or oxysulfide-based luminescent materials, there are used the following phosphors:

(1) A phosphor in the form of a solid solution including zinc sulfide (ZnS) having a particle size of from 1 to 10 $\mu$m, and silver (Ag) and chlorine (Cl) which are blue luminescent materials incorporated in the zinc sulfide (ZnS: Ag, Cl);

(2) A phosphor in the form of a solid solution including a zinc sulfide (ZnS) having a particle size of from 1 to 10 $\mu$m, and silver (Ag) and aluminum (Al) which are blue luminescent materials incorporated in the zinc sulfide (ZnS: Ag, Al);

(3) A phosphor in the form of a solid solution including a zinc sulfide (ZnS) having a particle size of from 1 to 10 $\mu$m, and silver (Ag), aluminum (Al), and copper (Cu) which are blue luminescent materials incorporated in the zinc sulfide (ZnS: Ag, Al, Cu);

(4) A phosphor in the form of a solid solution including a zinc sulfide (ZnS) having a particle size of from 1 to 10 $\mu$m, and copper (Cu) and aluminum (Al) which are green luminescent materials incorporated in the zinc sulfide (ZnS: Cu, Al);

(5) A phosphor in the form of a solid solution including a zinc sulfide (ZnS) having a particle size of from 1 to 10 $\mu$m, and copper (Cu), gold (Au), and aluminum (Al) which are green luminescent materials incorporated in the zinc sulfide (ZnS: Cu, Au, Al); and (6) A phosphor in the form of a solid solution including yttrium oxysulfide ($Y_2O_2S$) having a particle size of from 1 to 10 $\mu$m, and europium (Eu) which is a red luminescent material incorporated in the yttrium oxysulfide ($Y_2O_2S$: Eu).

In the manufacturing method of the luminescent material of the present invention, the phosphors (1) to (5) described above are used for the sulfide-based luminescent material, and the phosphor (6) described above is used for the oxysulfide-based luminescent material. However, whichever phosphor is used, the manufacturing method of the luminescent material is accomplished in the same manner. As water glass ($K_2O \cdot SiO_2$), Ohka Seal B (tradename) manufactured by TOKYO OHKA KOGYO CO., LTD., is used.

First, 18.7 g of water glass was added to 62 ml of ion-exchange water, to which 0.3 g of any one of the phosphors (1) to (6) was added with stirring for 10 minutes (S1), resulting in a suspension. The resulting suspension was added to a 0.073 wt % aqueous solution of barium acetate ($Ba(CH_3COO_2)$) with stirring for 15 minutes (S2). Then, phosphor particles were extracted from the aqueous solution by means of a centrifugal separator (S3), and dried by blasting 50° C. warm air for 24 hours (S4).

The luminescent material particles thus manufactured were determined for its composition by energy dispersive X-ray spectroscopy (EDX). As a result, it has been detected as follows: silicon (Si) 3.3 (atomic %), sulfur (S) 49.8 (atomic %) and zinc (Zn) 49.1 (atomic %).

Figure 3:
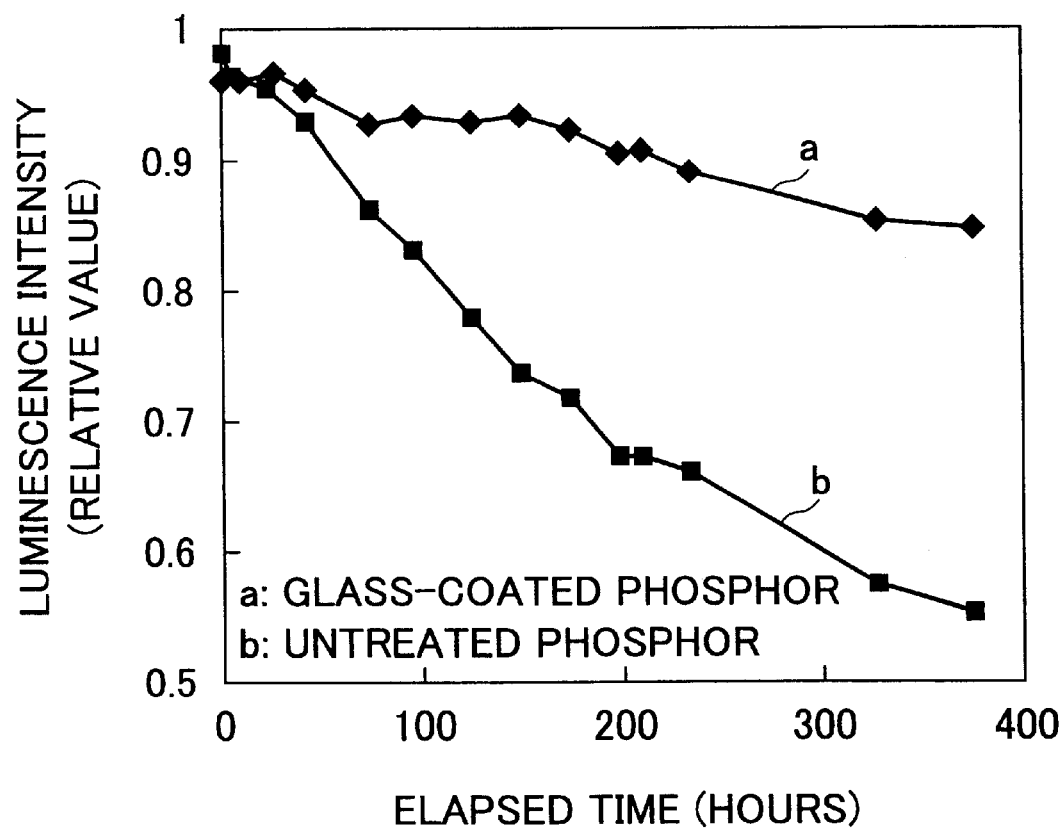
FIG. 3 is a graph for illustrating the luminance life of the luminescent material.

The luminescent material thus synthesized (ZnS: Ag, Cl) was taken out onto a glass plate, and irradiated with an electron beam having an acceleration voltage of 7 Kv and a current density of 13.3 $\mu$A/cm$^2$ to determine the time-varying luminance (luminance life). FIG. 3 is a graph for showing the results.

In FIG. 3, the ordinate represents the luminescence intensity (relative value), and the abscissa represents the time. In the graph, a reference character "a" denotes the luminance life characteristics of a phosphor subjected to glass-coating treatment in accordance with the present invention, while "b" denotes the luminance life characteristics of an untreated phosphor. For the phosphor subjected to glass-coating treatment of the present invention, the luminescence intensity after a lapse of about 390 hours is 0.88. In contrast, for the untreated phosphor, the luminescence intensity after a lapse of the same time period is 0.55. Thus, the degradation of the phosphor subjected to glass-coating treatment has been reduced to about ¼. The same measurements were also carried out for the phosphors (2) to (6). Although their respective characteristics are not shown, the degradation conditions thereof were almost the same. In this example, barium which is a divalent metallic salt has been taken as an example, but a trivalent metallic salt may also be adopted.

Respective conditions accomplished in the present invention are not restricted thereto. For example, even if the combination of the amount of water glass, the concentration of barium acetate, the order of addition, the stirring time, and the like is changed, an effective glass film can be manufactured.

In the present invention, the amount of water glass to be added is desirably from 5 to 100 ml, and in particular preferably from 15 to 30 ml. Further, the concentration of barium acetate is desirably from 0.001 to 1.0% by weight, and in particular preferably from 0.01 to 0.1% by weight.

Incidentally, as described above, although a large life improvement is implemented by the glass-coating treatment of the present invention, a reduction in luminance is observed with an increase in glass film thickness. This is considered to be attributable to the fact that the penetration distance of the electron beam into the luminescent material is reduced due to glass present on the particle surfaces.

Then, by using the luminescent material thus formed, a glass substrate for the FED and a CRT panel are manufactured. Namely, a luminescent surface is formed by applying each of the luminescent materials manufactured by the manufacturing method of the present invention on a glass substrate for the FED or a CRT panel (not shown). It is possible to form the luminescent surface in a shorter time as compared with the case by a deposition method or the like. Therefore, by using such a substrate or panel in combination with the FED main body or the CRT funnel portion, it is possible to improve the productivity of the FED or CRT.

Further, a FED or a CRT display apparatus is manufactured by using the glass substrate or CRT panel thus manufactured. Since the life characteristics of the luminescent material formed on the glass substrate or CRT panel is good, it is possible to extend the life of the FED or the CRT display.

What is claimed is:

1. A method for manufacturing a luminescent material, the method comprising the steps of:

adding a phosphor in the form of a solid solution comprising a sulfide or an oxysulfide, and a luminescent center substance incorporated in said sulfide or said oxysulfide, to an aqueous solution containing sodium silicate with stirring;

adding the resulting aqueous solution of a barium slat with stirring, the barium salt reacting with the sodium silicate to form a glass gel that coats the phosphor;

forcedly extracting particles of said phosphor, coated with said glass gel, from the resulting aqueous solution; and drying said particles of said phosphor extracted.

2. The method for manufacturing a luminescent material according to claim 1, said phosphor comprising a plurality of said luminescent center substances, wherein said sulfide is zinc sulfide, and said luminescent center substances are silver and chlorine.

3. The method for manufacturing a luminescent material according to claim 1, said phosphor comprising a plurality of said luminescent center substances, wherein said sulfide is zinc sulfide, and said luminescent center substances are silver and aluminium.

4. The method for manufacturing a luminescent material according to claim 1, said phosphor comprising a plurality of said luminescent center substances, wherein said sulfide is zinc sulfide, and said luminescent center substances are silver, aluminium, and copper.

5. The method for manufacturing a luminescent material according to claim 1, said phosphor comprising a plurality of said luminescent center substances, wherein said sulfide is zinc sulfide, and said luminescent center substances are copper and aluminium.

6. The method for manufacturing a luminescent material according to claim 1, said phosphor comprising a plurality of said luminescent center substances, wherein said sulfide is zinc sulfide, and said luminescent center substances are copper, gold, and aluminium.

7. The method for manufacturing a luminescent material according to claim 1, wherein said oxysulfide is yttrium oxysulfide, and said luminescent center substance is europium.

8. A luminescent material manufactured by a manufacturing method comprising the steps of:

adding a phosphor in the form of a solid solution comprising a sulfide or an oxysulfide, and a luminescent center substance incorporated in said sulfide or said oxysulfide, to an aqueous solution containing sodium silicate with stirring;

adding the resulting aqueous solution to an aqueous solution of a barium salt with stirring; the barium slat reacting with the sodium silicate to form a glass gel that coats the phosphor;

forcedly extracting particles of said phosphor from the resulting aqueous solution; and drying said particles of said phosphor extracted.

9. The luminescent material according to claim 8, said phosphor comprising a plurality of said luminescent center substances, wherein said sulfide is zinc sulfide, and said luminescent center substances are silver and chlorine.

10. The luminescent material according to claim 8, said phosphor comprising a plurality of said luminescent center substances, wherein said sulfide is zinc sulfide, and said luminescent center substances are silver and aluminium.

11. The luminescent material according to claim 8, said phosphor comprising a plurality of said luminescent center substances, wherein said sulfide is zinc sulfide, and said luminescent center substances are silver, aluminium, and copper.

12. The luminescent material according to claim 8, said phosphor comprising a plurality of said luminescent center substances, wherein said sulfide is zinc sulfide, and said luminescent center substances are copper and aluminium.

13. The luminescent material according to claim 8, said phosphor comprising a plurality of said luminescent center substances, wherein said sulfide is zinc sulfide, and said luminescent center substances are copper, gold, and aluminium.

14. The luminescent material according to claim 8, wherein said oxysulfide is yttrium oxysulfide, and said luminescent center substance is europium.

15. A display substrate comprising a luminescent material manufactured by a manufacturing method comprising the steps of:

adding a phosphor in the form of a solid solution comprising a sulfide or an oxysulfide, and a luminescent center substance incorporated in said sulfide or said oxysulfide, to an aqueous solution containing sodium silicate with stirring;

adding the resulting aqueous solution to an aqueous solution of a barium slat with stirring, the barium salt reacting with the sodium silicate to form a glass gel that coats the phosphor;

forcedly extracting particles of said phosphor from the resulting aqueous solution; and drying said particles of said phosphor extracted.

16. The display substrate according to claim 15, said phosphor comprising a plurality of said luminescent center substances, wherein said sulfide is zinc sulfide, and said luminescent center substances are silver and chlorine.

17. The display substrate according to claim 15, said phosphor comprising a plurality of said luminescent center substances, wherein said sulfide is zinc sulfide, and said luminescent center substances are silver and aluminium.

18. The display substrate according to claim 15, said phosphor comprising a plurality of said luminescent center substances, wherein said sulfide is zinc sulfide, and said luminescent center substances are silver, aluminium, and copper.

19. The display substrate according to claim 15, said phosphor comprising a plurality of said luminescent center substances, wherein said sulfide is zinc sulfide, and said luminescent center substances are copper and aluminium.

20. The display substrate according to claim 15, said phosphor comprising a plurality of said luminescent center substances, wherein said sulfide is zinc sulfide, and said luminescent center substances are copper, gold, and aluminium.

21. The display substrate according to claim 15, wherein said oxysulfide is yttrium oxysulfide, and said luminescent center substance is europium.

22. A display apparatus comprising a luminescent material manufactured by a manufacturing method comprising the steps of:

adding a phosphor in the form of a solid solution comprising a sulfide or an oxysulfide, and a luminescent center substance incorporated in said sulfide or said oxysulfide, to an aqueous solution containing sodium silicate with stirring;

adding the resulting aqueous solution to an aqueous solution of a barium salt with stirring, the barium slat reacting with the sodium silicate to form a glass gel that coats the phosphor;

forcedly extracting particles of said phosphor, coated with said glass gel, from the resulting aqueous solution; and drying said particles of said phosphor extracted.

23. The display apparatus according to claim 22, said phosphor comprising a plurality of said luminescent center substances, wherein said sulfide is zinc sulfide, and said luminescent center substances are silver and chlorine.

24. The display apparatus according to claim 22, said phosphor comprising a plurality of said luminescent center substances, wherein said sulfide is zinc sulfide, and said luminescent center substances are silver and aluminium.

25. The display apparatus according to claim 22, said phosphor comprising a plurality of said luminescent center substances, wherein said sulfide is zinc sulfide, and said luminescent center substances are silver, aluminium, and copper.

26. The display apparatus according to claim 22, said phosphor comprising a plurality of said luminescent center substances, wherein said sulfide is zinc sulfide, and said luminescent center substances are copper and aluminium.

27. The display apparatus according to claim 22, said phosphor comprising a plurality of said luminescent center substances, wherein said sulfide is zinc sulfide, and said luminescent center substances are copper, gold, and aluminium.

28. The display apparatus according to claim 22, wherein said oxysulfide is yttrium oxysulfide, and said luminescent center substance is europium.

* * * * *